United States Patent
Johnson et al.

(10) Patent No.: US 9,257,847 B2
(45) Date of Patent: Feb. 9, 2016

(54) PHOTOVOLTAIC SYSTEM WITH MANAGED OUTPUT

(75) Inventors: Robert Johnson, Richmond, CA (US);
Adrianne Kimber, Oakland, CA (US);
Carl J. S. Lenox, Oakland, CA (US);
Matt Campbell, Berkeley, CA (US)

(73) Assignee: SunPower Corporation, San Jose, CA (US)

( * ) Notice: Subject to any disclaimer, the term of this patent is extended or adjusted under 35 U.S.C. 154(b) by 1225 days.

(21) Appl. No.: 12/577,613

(22) Filed: Oct. 12, 2009

(65) Prior Publication Data

US 2011/0084551 A1    Apr. 14, 2011

(51) Int. Cl.
*H02J 3/00* (2006.01)
*H02J 3/38* (2006.01)

(52) U.S. Cl.
CPC ............ *H02J 3/383* (2013.01); *Y02E 10/563* (2013.01); *Y10T 307/352* (2015.04)

(58) Field of Classification Search
CPC .................................. H02J 3/383; H02J 3/385
USPC .................. 307/150; 136/243, 244; 250/200; 320/101; 706/14–44
See application file for complete search history.

(56) References Cited

U.S. PATENT DOCUMENTS

| 5,682,305 | A | 10/1997 | Kurokami et al. |
| 6,979,989 | B2* | 12/2005 | Schripsema et al. ........... 323/303 |
| 7,158,395 | B2* | 1/2007 | Deng et al. ....................... 363/95 |
| 2004/0123894 | A1* | 7/2004 | Erban ........................... 136/244 |
| 2007/0176767 | A1* | 8/2007 | Baumgaertner et al. ....... 340/538 |
| 2007/0271006 | A1* | 11/2007 | Golden et al. ................. 700/295 |
| 2009/0146501 | A1* | 6/2009 | Cyrus ............................. 307/84 |
| 2009/0179662 | A1* | 7/2009 | Moulton et al. ............... 324/771 |
| 2009/0183760 | A1* | 7/2009 | Meyer ........................... 136/244 |
| 2009/0192655 | A1 | 7/2009 | Ichikawa et al. |
| 2010/0204844 | A1* | 8/2010 | Rettger et al. ................. 700/291 |

FOREIGN PATENT DOCUMENTS

| DE | 3604513 A1 | 1/1987 |
| JP | 2005-086953 | 3/2005 |
| JP | 2005-312163 | 11/2005 |

OTHER PUBLICATIONS

Takashi Hiyama et al, Neural Network Based Estimation of Maximum Power, IEEE Energy Conversion, vol. 12, No. 3, Sep. 1997.*
A 50 Kilowatt Distributed Grid-Tied Connected Photovoltaic Generation System for the University of Wyoming, Chowdhury et al., 0-7803-3767-0/97 copyright 1997 IEEE.*
Neural Network Based Estimation of Maximum POwer Generation from PV Module Using Environmental Information, Hiyama et al., 0885-8969/97 copyright 1996 IEEE.*
Machine translation for JP 2005-312163.*

(Continued)

*Primary Examiner* — Fritz M Fleming
(74) *Attorney, Agent, or Firm* — Blakely Sokoloff Taylor Zafman LLP

(57) ABSTRACT

Photovoltaic systems with managed output and methods for managing variability of output from photovoltaic systems are described. A system includes a photovoltaic module configured to receive and convert solar energy to DC power. The system also includes a sensor configured to detect a future change in solar energy to be received by the photovoltaic module. The system further includes a power conditioning unit coupled with the photovoltaic module and the sensor.

15 Claims, 3 Drawing Sheets

(56) References Cited

OTHER PUBLICATIONS

International Search Report and Written Opinion from PCT/US2010/051500 mailed Jun. 10, 2011, 11 pgs.

International Preliminary Report on Patentability from PCT/US2010/051500 mailed Apr. 26, 2012, 8 pgs.

EP 10 82 3844, Supplementary European Search Report, Mar. 13, 2015, 4 pages.

\* cited by examiner

PHOTOVOLTAIC SYSTEM WITH MANAGED OUTPUT

TECHNICAL FIELD

Embodiments of the present invention are in the field of renewable energy and, in particular, photovoltaic systems with managed output and methods for managing variability of output from photovoltaic systems.

BACKGROUND

Common types of photovoltaic deployment include off-grid and on-grid systems. Off-grid systems are typically small (e.g., 10 s of kilowatts at most) and tied closely to an energy storage system such as a system of deep-cycle lead acid batteries or, in some cases, to a fueled gen-set. In an off-grid configuration, the energy stored in the battery acts as a buffer between energy production and demand. As such, short-term variability in the solar resource may not be an issue. On-grid systems, by contrast, may be quite large, with systems up to the 100 s of megawatts. To date, sizing of on-grid systems may be such that existing methods of handling load variability (e.g., by provision of ancillary services from generators on the grid) have been sufficient to ensure stability of the grid.

However, with advances in photovoltaic system technology, ever larger systems are being proposed and actually installed for use. Such larger systems may pose challenges for power management in at least two end markets, e.g., in island- or micro-grid systems or in very large photovoltaic plants integrated onto large grids. In either case, there may be restrictions on the maximum allowable ramp rates (both "up" and "down") that are permitted in order to maintain grid stability. Typically, the proposed method of managing variability of renewable resources is to add an energy storage component. However, there may be a lack of reliable, commercially proven, and cost effective storage unit compatible with a facility scale at the 100 s of kilowatts level or higher.

DETAILED DESCRIPTION

Figure 1:
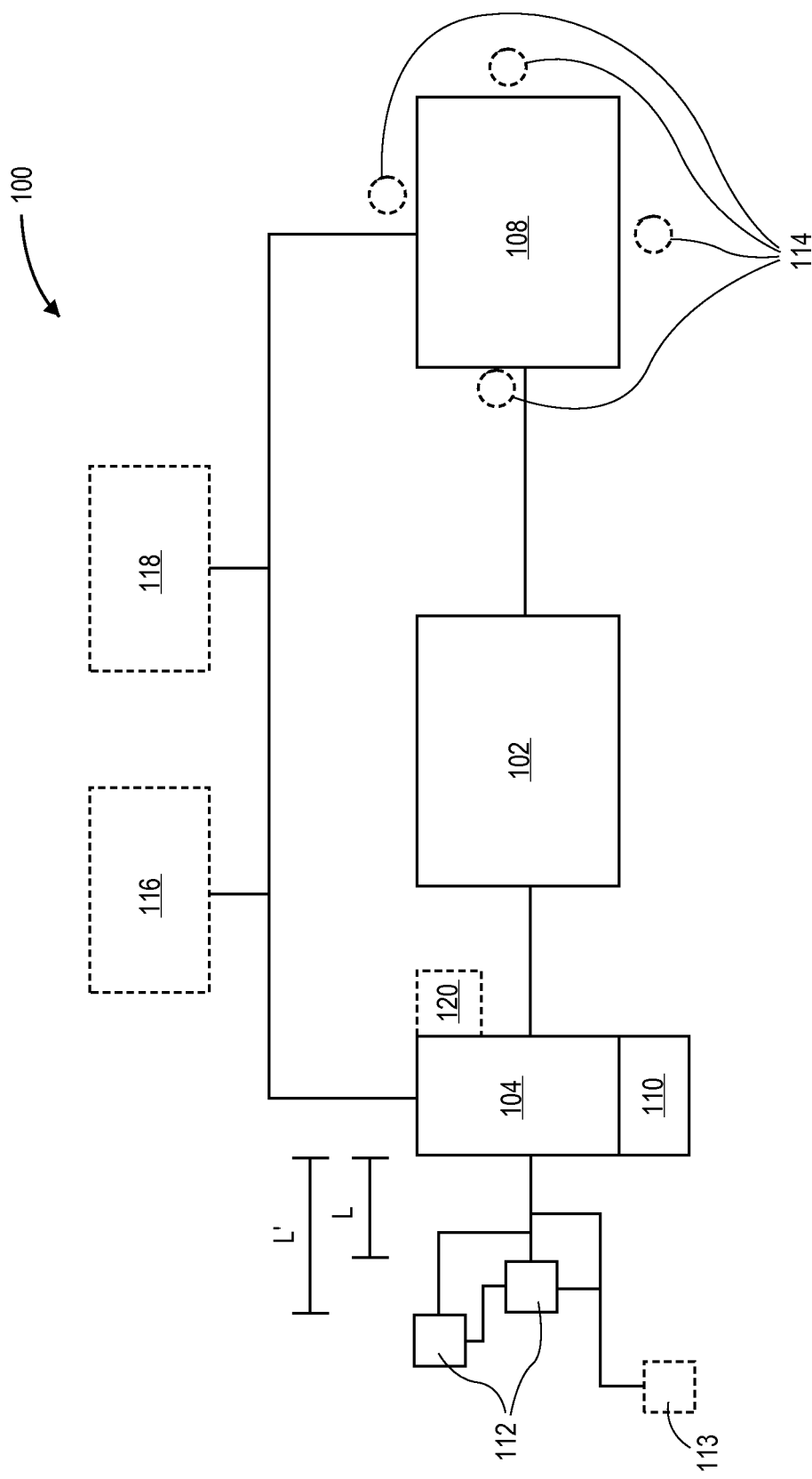
FIG. 1 illustrates a block diagram of a photovoltaic system with managed output, in accordance with an embodiment of the present invention.

Photovoltaic systems with managed output and methods for managing variability of output from photovoltaic systems are described herein. In the following description, numerous specific details are set forth, such as specific forms of power output, in order to provide a thorough understanding of the present invention. It will be apparent to one skilled in the art that embodiments of the present invention may be practiced without these specific details. In other instances, well-known data collection techniques, such as insolation data collection, are not described in detail in order to not unnecessarily obscure embodiments of the present invention. Furthermore, it is to be understood that the various embodiments shown in the Figures are illustrative representations and are not necessarily drawn to scale.

Disclosed herein are photovoltaic systems with managed output. In one embodiment, a system includes a photovoltaic module configured to receive and convert solar energy to DC power. The system also includes a sensor configured to detect a future change in solar energy to be received by the photovoltaic module. The sensor includes a portfolio of distributed photovoltaic systems or a pair of modules, each module positioned at a unique distance from the photovoltaic module. The system further includes a power conditioning unit coupled with the photovoltaic module and the sensor, the power conditioning unit configured to condition DC power from the photovoltaic module and to modify power output from the power conditioning unit based on the future change in solar energy.

Also disclosed herein are methods for managing variability of output from photovoltaic systems. In one embodiment, a method includes detecting a future change in solar energy to be received by a photovoltaic module. The detecting is performed by a sensor including a portfolio of distributed photovoltaic systems or a pair of modules, each module positioned at a unique distance from the photovoltaic module. The method also includes outputting power, from the photovoltaic system, based on the future change in solar energy.

A photovoltaic system with managed output may provide for mitigation of an otherwise inherent variability of such a photovoltaic system, particularly when integrated into an island- or micro-grid. In accordance with an embodiment of the present invention, a photovoltaic system with managed output controls solar generation ramp rates and ensures stability of an electrical grid. In an embodiment, a photovoltaic system with managed output is used to mitigate variability for systems that reach a size or level of penetration that impacts grid operations. A photovoltaic plant may generate DC power which may be inverted to AC power for use on a grid. In accordance with an embodiment of the present invention, an inverter or power conditioning system provides the capability to control the output of the photovoltaic plant, within the constraints of the actual power being produced by the plant. That is, the inverter or power conditioning system may be capable of controlling the photovoltaic plant in a manner such that less energy is exported to the grid than the plant is actually capable of generating at a given time.

Ramp-up control may be readily achieved by a power conditioning system. Accordingly, in an embodiment, situations where photovoltaic energy production increases suddenly (e.g., partially cloudy conditions when the sun emerges from behind a cloud) can be handled by a photovoltaic systems with managed output. Management may be achieved by altering a Maximum Power Point Tracking (MPPT) algorithm, which may generally be optimized to maximize the energy harvest of the photovoltaic system. In an embodiment, the MPPT algorithm is modified to produce less power for appropriate periods of time. This approach may act to temporarily lower the efficiency of the photovoltaic system modules with fast and accurate control. In addition, in one embodiment, photovoltaic system inverters are utilized to enhance grid stability by providing or absorbing reactive power.

An approach to controlling photovoltaic system or plant output include driving photovoltaic tracking systems such that the tracking systems are not pointing at the sun, but this may be less desirable from the standpoint of speed, accuracy, and level of control. While potentially useful, such a method of control does not directly address situations where the photovoltaic plant output drops quickly (e.g., when the sun is occluded by rapidly moving clouds). By contrast, in an embodiment, the need for energy storage is reduced or eliminated by managing photovoltaic plant output. For example, in accordance with an embodiment of the present invention, prediction, on a minutes-ahead basis, of the extent and speed of cloud cover is performed. In anticipation of a resulting change in intensity of solar radiation, a photovoltaic plant output may be reduced in a controlled fashion (e.g., respecting ramp rate limits) to the level expected once the cloud cover is at its point of maximum impact on photovoltaic plant production.

In an embodiment, methods for managing variability of output from photovoltaic systems include using a power conditioning system to skew the MPPT algorithm to lower the power output as a cloud approaches and then, as the cloud passes overhead, to skew the MPPT back towards the maximum power point in order to balance the dropping insolation, effectively maintaining steady output at the photovoltaic plant. Once insolation recovers, plant output may be controlled as described above to ensure conformance to ramp rate limits during ramp-up. The ability to control both power output level and reactive power may significantly increase the value of a photovoltaic system as a dispatchable resource. Such control may be used not only to mitigate variability of the solar resource, but also as a resource to help manage grid stability more generally, e.g., in the event of conventional power plant shutdowns, line faults, and other issues. In an embodiment, short-term forecasting based on sensor networks or data from the photovoltaic plant itself is used in conjunction with active inverter control to meet ramp rate limitations without the need for energy storage. In an embodiment, data from distributed systems is used to predict and control the output of centralized systems or multiple systems within high penetration control areas.

In an aspect of the present invention, photovoltaic systems with managed output are described. FIG. 1 illustrates a block diagram of a photovoltaic system with managed output, in accordance with an embodiment of the present invention.

Referring to FIG. 1, a photovoltaic system 100 has managed output. Photovoltaic system 100 includes a photovoltaic module 102 configured to receive and convert solar energy to DC power. Photovoltaic system 100 also includes a sensor 104 configured to detect a future change in solar energy to be received by photovoltaic module 102. Photovoltaic system 100 further includes a power conditioning unit 108 coupled with photovoltaic module 102 and sensor 104.

In accordance with an embodiment of the present invention, sensor 104 includes a portfolio of distributed photovoltaic systems 110 or a pair of modules 112, each module positioned at a unique distance (L and L') from photovoltaic module 102, or both. In one embodiment, sensor 104 is the portfolio of distributed photovoltaic systems 110. In a specific embodiment, the portfolio of distributed photovoltaic systems 110 includes nearby residential or commercial, or both, photovoltaic systems from a predetermined geographic area. In one embodiment, sensor 104 is the pair of modules 112. In a specific embodiment, the pair of modules 112 is configured to provide a delta in energy detected by the pair of modules 112. For example, the difference in detected solar radiation at one module is subtracted from the solar radiation detected at the second module and correlated with distance and bearing (e.g. L vs. L'). In a particular embodiment, sensor 104 further includes one or more additional modules 113, each module positioned at a unique distance from photovoltaic module 100.

Sensor 104 may further include or be associated with additional sensing systems to better target real time changes in energy input to photovoltaic module 102. For example, in an embodiment, sensor 104 further includes a network of insolation sensor modules 114 arranged around the perimeter of, or interspersed with, photovoltaic system 100. In another embodiment, sensor 104 further includes a network of still cameras or a combination of still and video cameras 116. In an embodiment, photovoltaic system 100 further includes a secondary sensor 118 coupled with sensor 104, secondary sensor 118 composed of a sensor such as, but not limited to, an anemometer, a wind vane, a satellite data source, or a temperature sensor. In another embodiment, photovoltaic system 100 further includes a neural-network 120 configured to compute a value for the future change in solar energy detected by sensor 104.

In accordance with an embodiment of the present invention, power conditioning unit 108 is configured to condition DC power from photovoltaic module 102 and to modify power output from the power conditioning unit based on the future change in solar energy. For example, in one embodiment, power conditioning unit 108 is an inverter, the inverter configured to invert, to AC power, DC power from photovoltaic module 102. In that embodiment, the inverter is also configured to modify AC power output from the inverter based on the future change in solar energy. In an alternative embodiment, power conditioning unit 108 conditions DC power from photovoltaic module 102 and then outputs the conditioned DC power based on the future change in solar energy.

Figure 2:
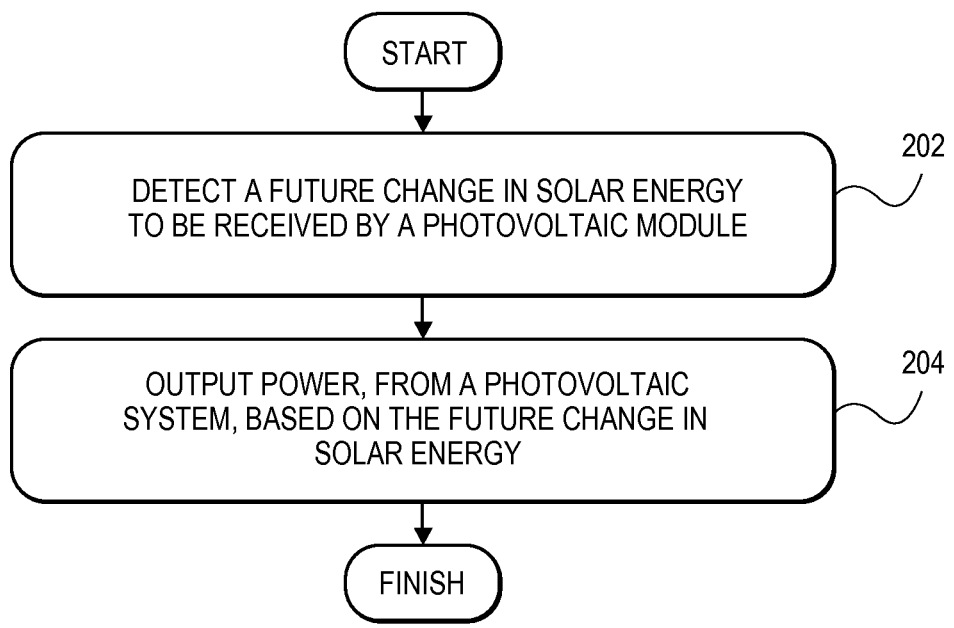
FIG. 2 illustrates a Flowchart representing operations in a method for managing variability of output from a photovoltaic system, in accordance with an embodiment of the present invention.

In another aspect of the present invention, methods are provided for managing variability of output from photovoltaic systems. FIG. 2 illustrates a Flowchart 200 representing operations in a method for managing variability of output from a photovoltaic system, in accordance with an embodiment of the present invention.

Referring to operation 202 of Flowchart 200, a method for managing variability of output from a photovoltaic system includes detecting a future change in solar energy to be received by a photovoltaic module. In accordance with an embodiment of the present invention, the detecting is performed by a sensor including a portfolio of distributed photovoltaic systems or a pair of modules, each module positioned at a unique distance from the photovoltaic module, or both.

In one embodiment, detecting the future change in solar energy to be received by the photovoltaic module includes detecting by the portfolio of distributed photovoltaic systems. In a specific embodiment, the portfolio of distributed photovoltaic systems includes nearby residential or commercial, or both, photovoltaic systems from a predetermined geographic area. In one embodiment, detecting the future change in solar energy to be received by the photovoltaic module includes detecting by the pair of modules. In a specific embodiment, the pair of modules is configured to provide a delta in energy detected by the pair of modules. For example, the difference in detected solar radiation at one module is subtracted from the solar radiation detected at the second module and correlated with distance and bearing. In a particular embodiment, the sensor further includes one or more additional modules, each module positioned at a unique distance from the photovoltaic module.

The sensor may further include or be associated with additional sensing systems to better target real time changes in energy input to the photovoltaic module. For example, in an embodiment, the sensor further includes a network of insolation sensor modules arranged around the perimeter of, or interspersed with, the photovoltaic system. In another embodiment, the sensor further includes a network of still cameras or a combination of still and video cameras. In an embodiment, detecting the future change in solar energy to be received by the photovoltaic module further includes detecting by a secondary sensor coupled with the sensor. The secondary sensor is composed of a sensor such as, but not limited to an anemometer, a wind vane, a satellite data source, or a temperature sensor. In another embodiment, detecting the future change in solar energy to be received by the photovoltaic module further includes computing, by a neural-network, a value for the future change in solar energy.

Referring to operation 204 of Flowchart 200, the method for managing variability of output from a photovoltaic system further includes outputting power, from the photovoltaic system, based on the future change in solar energy. In accordance with an embodiment of the present invention, the power conditioning unit is configured to condition DC power from the photovoltaic module and to modify power output from the power conditioning unit based on the future change in solar energy. For example, in one embodiment, the power conditioning unit is an inverter, the inverter configured to invert, to AC power, DC power from the photovoltaic module. In that embodiment, the inverter is also configured to modify AC power output from the inverter based on the future change in solar energy. In an alternative embodiment, the power conditioning unit conditions DC power from the photovoltaic module and the outputs the conditioned DC power based on the future change in solar energy.

In an embodiment, the present invention is provided as a computer program product, or software product, that includes a machine-readable medium having stored thereon instructions, which is used to program a computer system (or other electronic devices) to perform a process or method according to embodiments of the present invention. A machine-readable medium may include any mechanism for storing or transmitting information in a form readable by a machine (e.g., a computer). For example, in an embodiment, a machine-readable (e.g., computer-readable) medium includes a machine (e.g., a computer) readable storage medium (e.g., read only memory ("ROM"), random access memory ("RAM"), magnetic disk storage media or optical storage media, flash memory devices, etc.).

Figure 3:
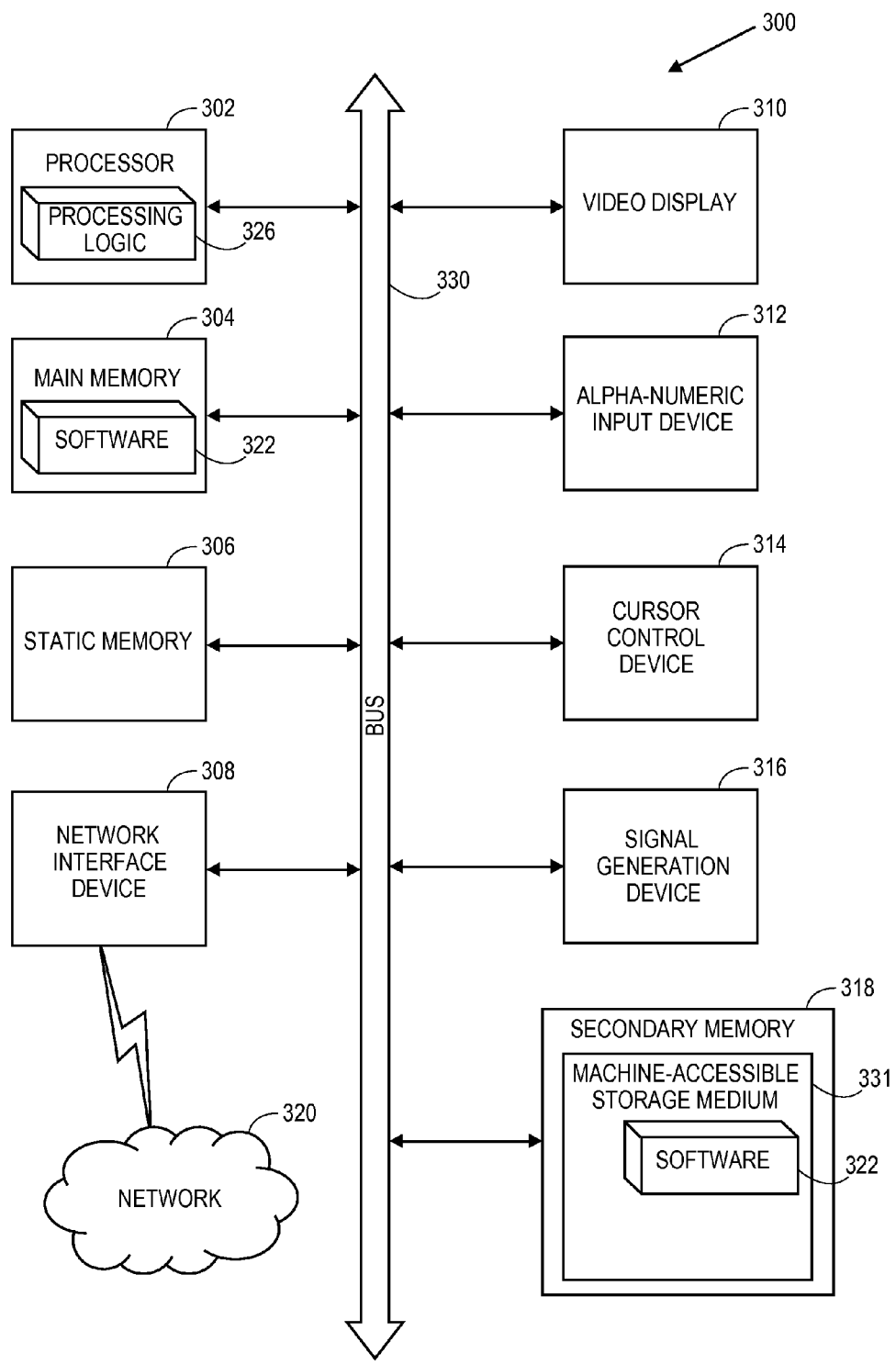
FIG. 3 illustrates a block diagram of an example of a computer system configured for performing a method for managing variability of output from a photovoltaic system, in accordance with an embodiment of the present invention.

FIG. 3 illustrates a diagrammatic representation of a machine in the form of a computer system 300 within which a set of instructions, for causing the machine to perform any one or more of the methodologies discussed herein, is executed. For example, in accordance with an embodiment of the present invention, FIG. 3 illustrates a block diagram of an example of a computer system configured for performing a method for managing variability of output from a photovoltaic system. In alternative embodiments, the machine is connected (e.g., networked) to other machines in a Local Area Network (LAN), an intranet, an extranet, or the Internet. In an embodiment, the machine operates in the capacity of a server or a client machine in a client-server network environment, or as a peer machine in a peer-to-peer (or distributed) network environment. In an embodiment, the machine is a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers or processors) that individually or jointly execute a set (or multiple sets) of instructions to perform any one or more of the methodologies discussed herein.

The example of a computer system 300 includes a processor 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a secondary memory 318 (e.g., a data storage device), which communicate with each other via a bus 330.

Processor 302 represents one or more general-purpose processing devices such as a microprocessor, central processing unit, or the like. More particularly, in an embodiment, the processor 302 is a complex instruction set computing (CISC) microprocessor, reduced instruction set computing (RISC) microprocessor, very long instruction word (VLIW) microprocessor, processor implementing other instruction sets, or processors implementing a combination of instruction sets. In one embodiment, processor 302 is one or more special-purpose processing devices such as an application specific integrated circuit (ASIC), a field programmable gate array (FPGA), a digital signal processor (DSP), network processor, or the like. Processor 302 executes the processing logic 326 for performing the operations discussed herein.

In an embodiment, the computer system 300 further includes a network interface device 308. In one embodiment, the computer system 300 also includes a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 316 (e.g., a speaker).

In an embodiment, the secondary memory 318 includes a machine-accessible storage medium (or more specifically a computer-readable storage medium) 331 on which is stored one or more sets of instructions (e.g., software 322) embodying any one or more of the methodologies or functions described herein, such as a method for associating a load demand with a variable power generation. In an embodiment, the software 322 resides, completely or at least partially, within the main memory 304 or within the processor 302 during execution thereof by the computer system 300, the main memory 304 and the processor 302 also constituting machine-readable storage media. In one embodiment, the software 322 is further transmitted or received over a network 320 via the network interface device 308.

While the machine-accessible storage medium 331 is shown in an embodiment to be a single medium, the term "machine-readable storage medium" should be taken to include a single medium or multiple media (e.g., a centralized or distributed database, or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of embodiments of the present invention. The term "machine-readable storage medium" shall accordingly be taken to include, but not be limited to, solid-state memories, and optical and magnetic media.

It is to be understood that embodiments of the present invention may be relevant where the size of a photovoltaic system is such that it has a material impact on the operation or maintenance of a utility power system. In one embodiment, the material impact occurs at a level where the peak power of the photovoltaic system is significant relative to the peak capacity of the portion of the grid the system that it is tied into. In a specific embodiment, the level is approximately above 10% of a feeder, a substation, or a regulation service capacity. However, other embodiments are not limited to such levels.

It is also to be understood that for sensor modules, each module and each sensor of each "sensor module" may tied to separate power conditioning systems, or each sensor module pair may be tied to a power conditioning system separate from other sensor module pairs.

Thus, photovoltaic systems with managed output and methods for managing variability of output from photovoltaic systems have been disclosed. In accordance with an embodiment of the present invention, a system includes a photovoltaic module configured to receive and convert solar energy to DC power. The system also includes a sensor configured to detect a future change in solar energy to be received by the photovoltaic module. The sensor includes a portfolio of distributed photovoltaic systems or a pair of modules, each module positioned at a unique distance from the photovoltaic module. The system further includes a power conditioning unit coupled with the photovoltaic module and the sensor, the power conditioning unit configured to condition DC power from the photovoltaic module and to modify power output from the power conditioning unit based on the future change in solar energy. In one embodiment, the sensor is the portfolio of distributed photovoltaic systems, the portfolio of distributed photovoltaic systems comprising nearby residential or commercial, or both, photovoltaic systems from a predetermined geographic area. In another embodiment, the sensor is the pair of modules, the pair of modules configured to provide a delta in energy detected by the pair of modules.

What is claimed is:

1. A photovoltaic system with managed output, the system comprising:
    a photovoltaic module configured to receive and convert solar energy to DC power, the photovoltaic module integrated with an island- or micro-grid;
    a sensor configured to detect a future change in solar energy to be received by the photovoltaic module, the sensor comprising a portfolio of distributed photovoltaic systems, the portfolio of distributed photovoltaic systems comprising nearby residential or commercial, or both, photovoltaic systems from a predetermined geographic area; and
    a power conditioning unit coupled with the photovoltaic module and the sensor, the power conditioning unit configured to condition DC power from the photovoltaic module and to modify total power output from the power conditioning unit based on the future change in solar energy in anticipation of the future change in solar energy, wherein the power conditioning unit includes an inverter, the inverter configured to invert DC power from the photovoltaic module to AC power, the inverter also configured to modify AC power output from the inverter based on the future change in solar energy, and wherein the power conditioning unit:
        decreases an efficiency of the photovoltaic module before the future change in solar energy occurs to export an amount of energy to the island- or micro-grid, the amount of energy being a maximum amount of energy the photovoltaic module is expected to be capable of generating when the future change in solar energy occurs, the amount of energy being less than the photovoltaic module is capable of generating before the future change in solar energy occurs, and
        increases the efficiency of the photovoltaic module when the future change in solar energy occurs to export the same amount of energy to the island- or micro-grid.

2. The photovoltaic system of claim 1, wherein the sensor further comprises a network of insolation sensor modules arranged around the perimeter of the photovoltaic system.

3. The photovoltaic system of claim 1, wherein the sensor further comprises a network of still cameras or a combination of still and video cameras.

4. The photovoltaic system of claim 1, further comprising:
    a secondary sensor coupled with the sensor, the secondary sensor selected from the group consisting of an anemometer, a wind vane, a satellite data source, and a temperature sensor.

5. The photovoltaic system of claim 1, further comprising:
    a neural-network configured to compute a value for the future change in solar energy detected by the sensor.

6. A method for managing variability of output from a photovoltaic system, the method comprising:
    detecting a future change in solar energy to be received by a photovoltaic module integrated with an island- or micro-grid, the detecting performed by a sensor comprising a portfolio of distributed photovoltaic systems, the portfolio of distributed photovoltaic systems comprising nearby residential or commercial, or both, photovoltaic systems from a predetermined geographic area; and
    outputting total power, from the photovoltaic system, based on the future change in solar energy in anticipation of the future change in solar energy, wherein a power conditioning unit:
        decreases an efficiency of the photovoltaic module before the future change in solar energy occurs to export an amount of energy to the island- or micro-grid, the amount of energy being a maximum amount of energy the photovoltaic module is expected to be capable of generating when the future change in solar energy occurs, the amount of energy being less than the photovoltaic module is capable of generating before the future change in solar energy occurs, and
        increases the efficiency of the photovoltaic module when the future change in solar energy occurs to export the same amount of energy to the island- or micro-grid.

7. The method of claim 6, wherein the sensor further comprises a network of insolation sensor modules arranged around the perimeter of the photovoltaic system.

8. The method of claim 6, wherein the sensor further comprises a network of still cameras or a combination of still and video cameras.

9. The method of claim 6, wherein detecting the future change in solar energy to be received by the photovoltaic module further comprises detecting by a secondary sensor coupled with the sensor, the secondary sensor selected from the group consisting of an anemometer, a wind vane, a satellite data source, and a temperature sensor.

10. The method of claim 6, wherein detecting the future change in solar energy to be received by the photovoltaic module further comprises computing, by a neural-network, a value for the future change in solar energy.

11. A machine-accessible storage medium having instructions stored thereon, wherein the instructions are executable by a data processing system to perform:
    receiving an indication of a detected future change in solar energy for a photovoltaic module of a photovoltaic system integrated with an island- or micro-grid, the detected future change in solar energy received by a sensor comprising a portfolio of distributed photovoltaic systems, the portfolio of distributed photovoltaic systems comprising nearby residential or commercial, or both, photovoltaic systems from a predetermined geographic area; and providing to a power conditioning unit of the photovoltaic system an indication to output total power from the photovoltaic system based on the future change in solar energy in anticipation of the future change in solar energy, wherein the power conditioning unit includes an inverter, the inverter configured to invert DC power from the photovoltaic module to AC power, the inverter also configured to modify AC power output from the inverter based on the future change in solar energy, and wherein the power conditioning unit:

decreases an efficiency of the photovoltaic module before the future change in solar energy occurs to export an amount of energy to the island- or micro-grid, the amount of energy being a maximum amount of energy the photovoltaic module is expected to be capable of generating when the future change in solar energy occurs, the amount of energy being less than the photovoltaic module is capable of generating before the future change in solar energy occurs, and increases the efficiency of the photovoltaic module when the future change in solar energy occurs to export the same amount of energy to the island- or micro-grid.

12. The machine-accessible storage medium of claim 11, wherein the sensor further comprises a network of insolation sensor modules arranged around the perimeter of the photovoltaic system.

13. The machine-accessible storage medium of claim 11, wherein the sensor further comprises a network of still cameras or a combination of still and video cameras.

14. The machine-accessible storage medium of claim 11, wherein detecting the future change in solar energy to be received by the photovoltaic module further comprises detecting by a secondary sensor coupled with the sensor, the secondary sensor selected from the group consisting of an anemometer, a wind vane, a satellite data source, and a temperature sensor.

15. The machine-accessible storage medium of claim 11, wherein detecting the future change in solar energy to be received by the photovoltaic module further comprises computing, by a neural-network, a value for the future change in solar energy.

\* \* \* \* \*